United States Patent [19]
Guerin et al.

[11] Patent Number: 5,918,356
[45] Date of Patent: Jul. 6, 1999

[54] TOOLS FOR MOUNTING A TURBO AERO ENGINE DISTRIBUTOR

[75] Inventors: Jacques Georges Philippe Guerin, Boussy Saint Antoine; Pierre Ange Jean Antoine Trecan, Montgeron, both of France

[73] Assignee: Societe Nationale d'Etude Et de Construction de Moteurs d'Aviation "Snecma", Paris, France

[21] Appl. No.: 08/840,852

[22] Filed: Apr. 17, 1997

[51] Int. Cl.$^6$ .................................................. B25B 27/14
[52] U.S. Cl. ............................................ 29/281.5; 269/71
[58] Field of Search ............................... 29/281.5, 281.1; 269/43, 45, 71, 17, 104; 254/DIG. 16, 134

[56] References Cited

U.S. PATENT DOCUMENTS

| | | | |
|---|---|---|---|
| 546,421 | 9/1895 | Duke | 269/45 |
| 1,013,711 | 1/1912 | Wiggins | 269/45 |
| 3,814,413 | 6/1974 | Bopp | 269/71 |
| 3,849,023 | 11/1974 | Klompas . | |
| 4,070,011 | 1/1978 | Glesser | 269/45 |
| 4,090,625 | 5/1978 | Walters | 269/71 |
| 4,949,944 | 8/1990 | Groff | 269/45 |
| 5,190,265 | 3/1993 | Barry et al. | 254/134 |
| 5,203,540 | 4/1993 | Lee | 254/DIG. 16 |
| 5,224,691 | 7/1993 | Clark | 269/71 |
| 5,232,340 | 8/1993 | Morgan . | |
| 5,316,202 | 5/1994 | Murray . | |
| 5,358,227 | 10/1994 | Bennett et al. | 269/71 |

FOREIGN PATENT DOCUMENTS 0 334 794  9/1989  European Pat. Off. .

*Primary Examiner*—Robert C. Watson
*Attorney, Agent, or Firm*—Oblon, Spivak, McClelland, Maier & Neustadt, P.C.

[57] ABSTRACT

Tooling for mounting angular sectors (8) of a distributor vane grid in a turbo aero engine casing (1), especially for a low pressure turbine. The mounting edge of the sectors (8) includes projections whose disposition requires a particular extremely precise movement to embody mounting. This is effected by using a set of tools including the support plates (58) of the sectors (8) suspended by connecting rods (60 and 61) from a circular plate (51) able to move vertically so as to start the engagement of the sectors (8) in their throat (84). The connecting rods (60 and 61) are disposed so as to enable the support (58) to move backward and be slanted and thus move back the projections of the uneven sectors (8) of the casing (1) and then engage them in the throat.

9 Claims, 7 Drawing Sheets

TOOLS FOR MOUNTING A TURBO AERO ENGINE DISTRIBUTOR

FIELD OF THE INVENTION

The invention concerns tools for mounting a turbo aero engine distributor.

BACKGROUND OF THE INVENTION

Turbo aero engine distributors are fixed vanes disposed in a circle and disposed in front of the vanes linked to the rotor, especially in low pressure turbo aero engines, and whose function is to ensure an appropriate correction of the flow of the gases of the motor so as to increase the yield of said motor.

In practice, these distributors are composed of juxtaposed sectors each extending onto an arc of a circle, and imperviousness plates extending between the sectors so as to prohibit any gas leaks as much as possible.

The purpose of the invention is to create a particular shape for distributor sectors: their radially outer edge is fitted on one side with a circular projection extending in an axial direction and on the other side with a circular projection extending in a radial direction: these projections known as overlays are intended to ensure the mounting of the distributor sectors in the housing of the turbo aero engine which for this purpose is provided with an axial lip against which the first projection rests, and a radial lip against which the second projection rests. However, it is impossible to make the projections enter the housings delimited by the lips by means of a single movement so that it is impossible to carry out a manual mounting as effected with distributor sectors having a simpler shape.

The invention relates to tools able to easily mount this type of distributor sectors in their locations of the turbo aero engine housing after having been picked up; this tool can also be used to dismantle this distributor by contrary operations, as shall be subsequently revealed in the remainder of this description.

To sum up, the invention concerns a tool for mounting a turbo aero engine distributor formed of adjacent arc of a circle shaped sectors in a turbine casing provided with two annular housings, the first of the housings situated on a tapered side of the casing being delimited by a first lip of the casing extending axially opposite the tapered side, the second housing situated on a flared side of the casing being delimited by a second lip of the casing extending radially towards the inside, the sectors including on a radially external portion a first projection engaged in the first housing and extending axially towards the tapered side when the distributor is mounted in the casing, and the second projection engaged in the second housing and extending radially towards the outside when the distributor is mounted in the casing, the tool being characterized by:

a circular plate,
sector mounting units associated respectively with the distributor sectors and each including:
  a sector support,
  a mechanism for suspending the sector support from the circular plate,
  and a mechanism for controlling tilting of the sector support, said mechanism being disposed between the sector support and the circular plate making it possible to slant the sector borne by the support.

In the currently retained embodiment, the suspension mechanism includes a pair of connecting rods joined to the sector support; one of the connecting rods is also joined to the plate and the other is also joined to a member common to all the mounting units of the tilting control mechanism.

A particularly simple tilting control mechanism includes a nut screwed onto a threaded spindle of the plate, and a crown rotating in the nut around the threaded spindle: this crown is actually said common member.

So as to start mounting, it is useful to lower a precise movement of the sector supports: for this purpose, the tool may include a plane on which the casing is laid and from which the plate is suspended by a lowering mechanism possibly consisting of a second nut screwed onto the threaded spindle and placed on a chuck of the base, the spindle sliding along the chuck with a rotation stoppage link.

The suspension of the sector supports needs to be flexible when introducing the projections of the sectors in the housings delimited by the lips of the casing, but this flexibility was previously not really favorable, especially when the previously arranged sectors had to be picked up by the supports: this is why it is preferable to add an articulation inhibition mechanism, possibly being released, which connects to the circular plate the projections joined to the latter and temporarily immobilizes them. A simple conception for this articulation inhibition mechanism is a spring-back return movement mechanism which imposes a tilting of the connecting rods radially towards the inside when it is released via the action of a spring, for example.

The tool may include a plane for laying the distributor sectors according to a disposition approximately identical to their mounting disposition in the casing: this makes it possible to manually assemble the distributor before its segments are picked up by the mounting units.

Finally, the tools can also facilitate the mounting of rotor wheels situated behind the distributors once the latter are mounted: this concerns elements, such as a retaining ring, whose effect is to retain the imperviousness segments placed in the casing close to the distributor and extending around the wheel of the rotor: thus, any risk of these sealing elements moving when inserting the wheel is eliminated. A stage preliminary to installation of the retaining ring can be carried out if blocks, able to move is a radial direction, are provided on the tool and disposed so as to press the sealing elements on the casing before the mounting units release the distributor sectors and the tool is withdrawn.

BRIEF DESCRIPTION OF THE DRAWINGS

The invention is hereafter described in more detail with the aid of the following figures given by way of nonrestrictive illustration.

Figure 7:
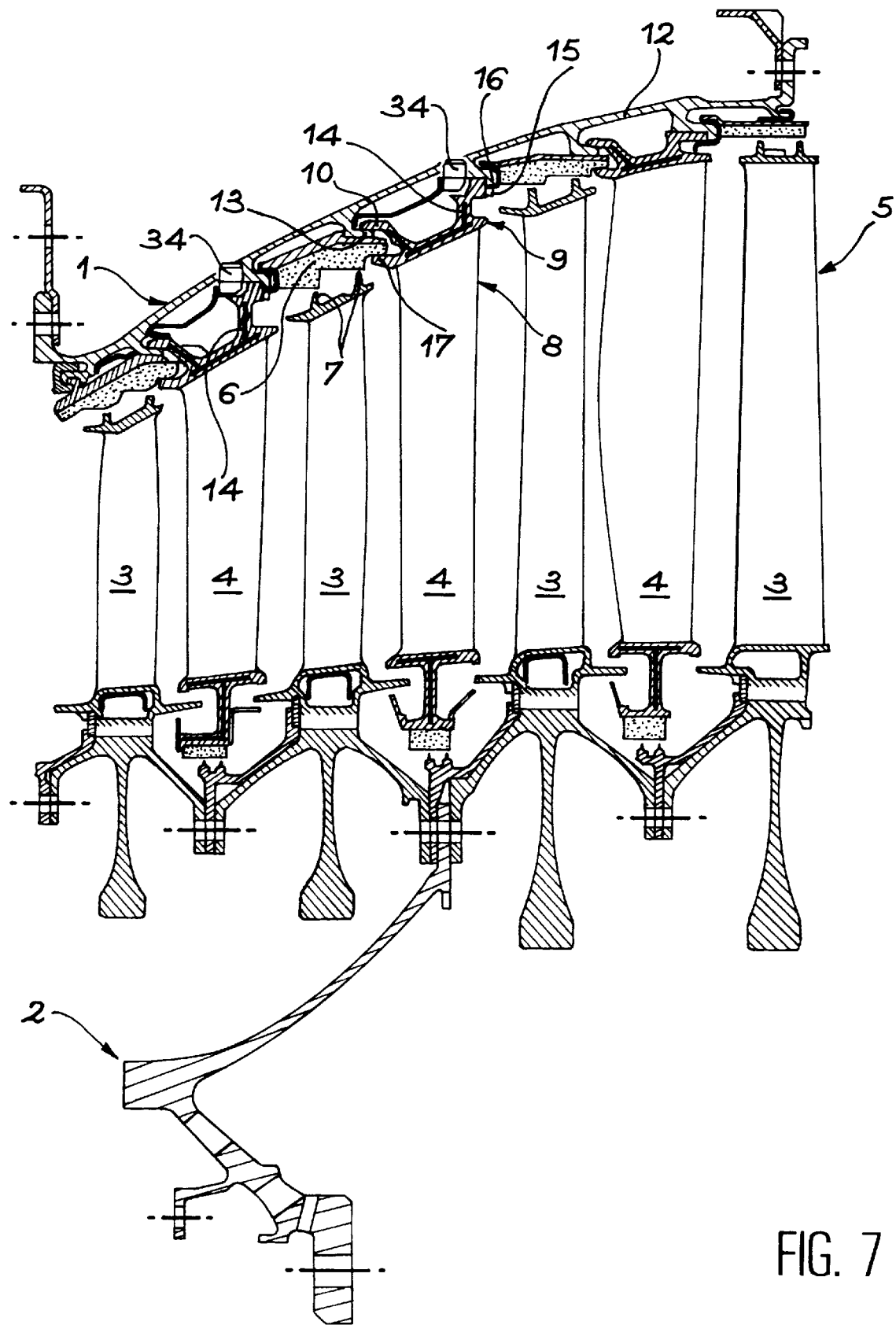
FIG. 7 is a more general view of the turbine.

A longitudinal half-section of a turbo aero engine turbine is represented in FIG. 7: a low pressure turbine casing 1 of a turbo aero engine tapers towards the front, that is towards the left of the figure, and flares towards the rear at the right; it contains a rotor 2 and rotor wheels 3 formed of a circle of spring-back vanes alternate with distributors 4 fixed in the intermediate annular vein 5 between the casing 1 and the rotor 2. Imperviousness at the level of the rotor wheels 3 is ensured by arc of a circle segments 6 made of an abradable material, that is with easy erosion and which can be hollowed out by peaks known as circular slices 7 established at the end of the rotor wheels 3 and which reach the abradable material 6 and hollow it out in normal service conditions when more significant heating of the rotor 2 produces significant heat deformations.

Figure 6:
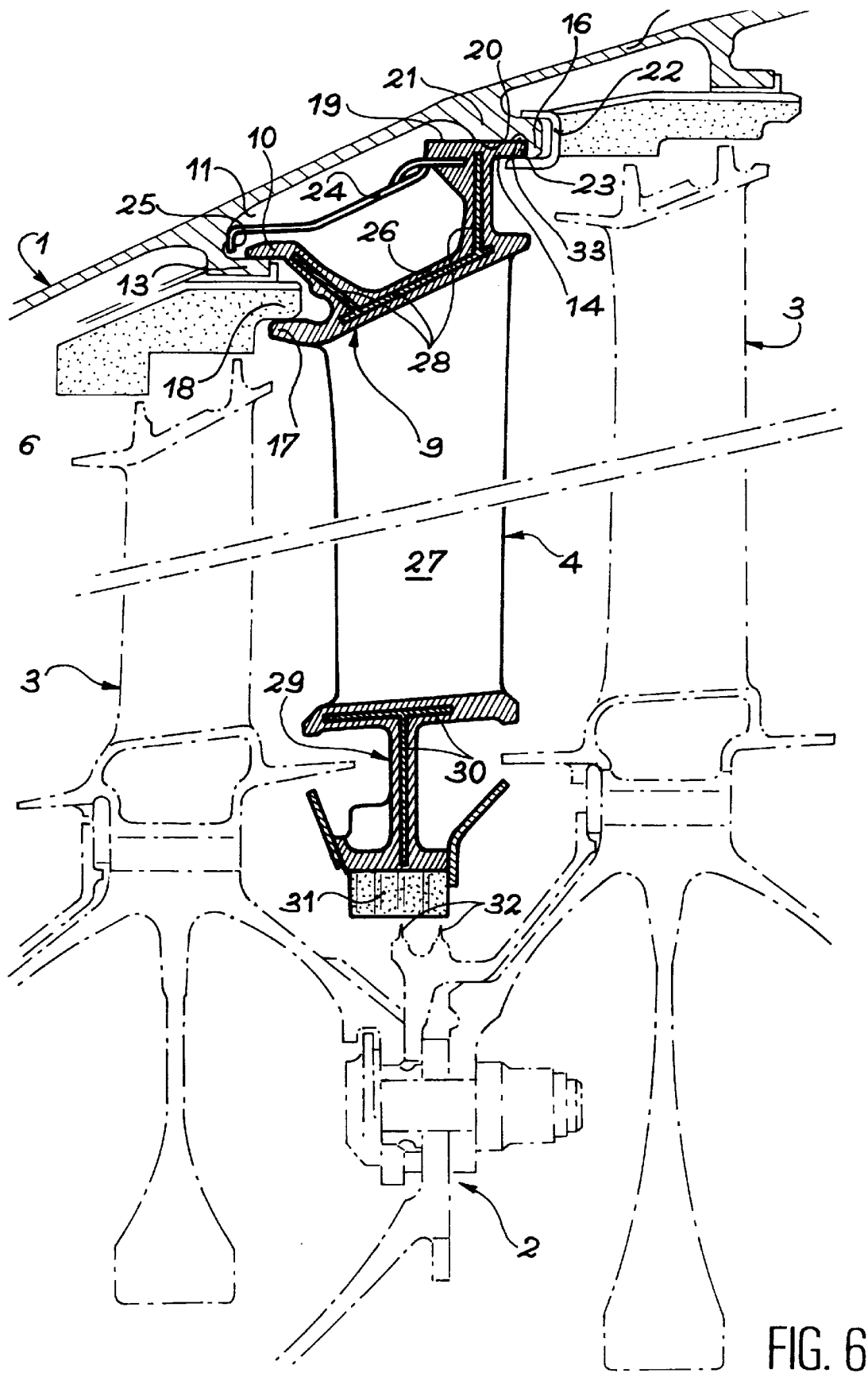
FIG. 6 shows a distributor sector mounted in a turbine.

The distributors 4 are formed of adjacent sectors 8 each extending over a circumference fraction and all being identical: this applies in particular to their foot 9, that is their portion connecting them to the casing 1 and on which several large elements can be distinguished with reference also to FIG. 6.

A first projection 10 constitutes a projection with an axial orientation and directed towards the tapered side of the casing 1 when mounting is completed; it penetrates into a first housing 11 of the casing 1 delimited by an external skin 12 of the latter and by an axial lip 13 directed towards the flared side. The diameter of this axial lip is directly smaller than that of the first projection 10 to enable it to rest on it. A second projection 14 situated on the flared side of the casing 1 is at the time of mounting directed radially externally and rests via a lateral surface 15 situated towards the flared side of the casing 1 against a radial lip 16 extending inwardly from said casing. Thus, the adjustment of the first projection 10 prohibits the radial movements of the sector 8 inwardly and the adjustment of the second projection 14 prohibits movements towards the rear. The mounting of the distributor 4 is completed by other supports: this is why the sectors 8 have a third projection 17 parallel to the first projection 10 and which rests in a radial direction against an extremity 18 of the abradable coating 6 situated immediately in front; and the second projection 14 also rests via a radially external surface 19 against a circular bearing area 20 of a junction rib 21 connecting the second lip 16 to the skin 23 of the casing 1. These two supports prohibit the sectors 8 of the distributor from making any radial movements outwardly. It ought to to be mentioned that each abradable coating 6 is provided with a hook 22 at its front extremity and which opens towards the front so as to imprison the second lip 16 and cover it completely, as well as a rear extremity portion 23 of the second projection 14 which is then retained against the radial movements towards the inside. Finally, a thermal shield 24 is embedded in the second projection 14 and extends around the foot 9 of the sector 8 as far as in front of the first projection 10, its free extremity 25 touching the skin 12 of the casing 1.

The foot 9 further includes a linking ring 26 which connects the front projections 10 and 17 to the rear projection 14 and bears the vanes 27: as imperviousness needs to be re-established between the adjacent sectors 8, grooves are provided on the lateral faces of the feet 9 along the linking ring 26 and the first and second projections 10 and 14 in which the imperviousness plate edges are introduced 28 which cover the interval of adjacent sectors 8. Similar imperviousness plates 30 are located between adjacent sectors 8 at the level of the extremity directed towards the rotor 2 of the vanes 27 between adjacent portions of a free extremity linking ring 29 which unite the vanes 27 of a given sector 8.

Finally, the free extremity linking ring 29 also bears an abradable coating 31 rubbed by the slices 32 belonging to the rotor 2.

The most delicate part of mounting therefore consists of respectively introducing the first and second projections 10 and 14 into the housing 11 and a housing 33 delimited by the second lip 16 and the circular bearing surface 20, which is not possible via a purely axial movement in the casing 1 as the second lip 16 surrounds an opening with a diameter smaller than the outer diameter of the second projection 14 on the external surface 19. However, all the arc of a circle sectors need to be mounted at the same time subject to pulling the sealing plates 28 and 30 up from their groove; and it is necessary to take account of the presence of rotation stoppage slugs 34 (FIG. 7) engaged in a radial direction through the casing 1, as well as in the corresponding recesses of the feet 9 at the location of the second projections 14 so as to prevent the sectors 8 from rotating as the sectors 8 also need to be mounted at a precise angular position on the circumference of the casing 1. These requirements for carrying out a delicate precise positioning when mounting all the sectors 8 at the same time renders a direct manual mounting impossible.

Figure 1:
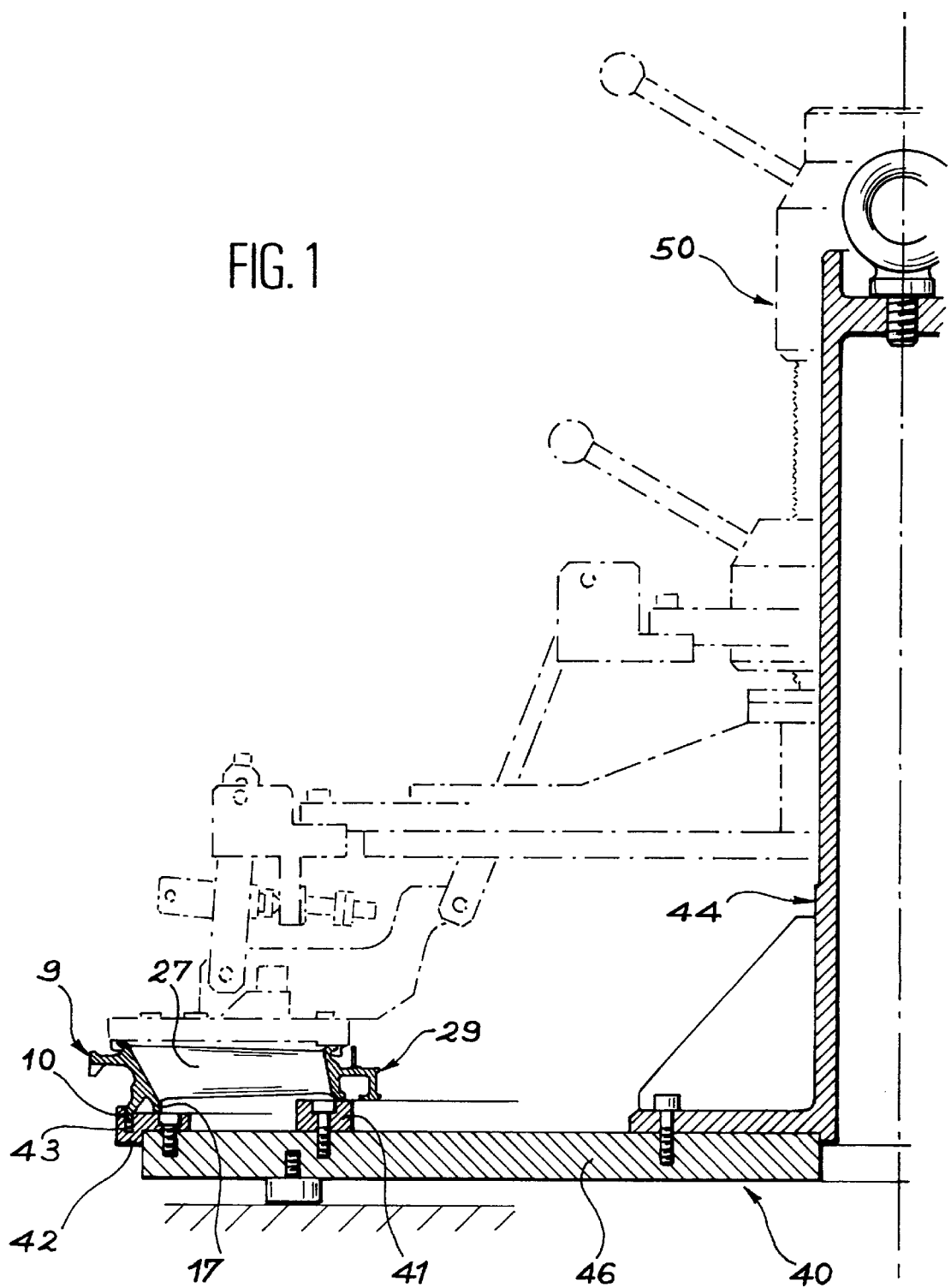
FIG. 1 represents a tool for the preliminary mounting of the distributor sectors.

The tool able to resolve this mounting problem first of all includes a mounting plane 40 of the distributor 4 outside the casing 1 shown on FIG. 1. This mounting plane 40 is circular and illustrated as a half section. It includes two concentric crowns 41 and 42 screwed onto a disk 46. The sectors 8 are laid on the first crown 41 via their free extremity linking ring 29 and on the second crown 42 via the foot 9 and more specifically by the third projection 17 and by the first projection 10. This projection 10 is engaged in a throat 43 hollowed out in the second crown 42 which places the sectors 8 with a good inclination for mounting, and in a mutual disposition similar to that they take up once mounted in the casing 1. The sealing plates 28 and 30 are slid into the grooves at the lateral edges of the sectors 8 and kept in place with a slight adherence by some grease. Shims (not shown) can be slid between the adjacent sectors 8 so as to support them with the desired spacing.

The disk 46 is linked to a mandrel 44 which rises up at the center of the latter and around which the main tool 50 is attached. This tool 50 is now to be described with reference to FIG. 2 and is basically formed of a circular plate 51 at the center of which a threaded spindle 52 lifts up and which bears around it a set of units for mounting the sectors 8, said units being equal to the number of the latter. The threaded spindle 52 is hollow and is wound around the mandrel 44 until the latter stops against the internal ring of a ball bearing 54 disposed in a lowering nut 55 screwed to the top of the threaded spindle 52.

The outer ring of the ball bearing 54 is fixed to the lowering nut 55. The rotation of the lowering nut 55 in the desired direction results in a lowering of the threaded spindle 52 and the mounting units 53 towards the sectors 8 of the distributor 4: this is precisely what is undertaken to pick up these sectors, the main tool 50 arriving at the position shown on FIG. 1. The mounting units 53 include a plate-shaped sector support 58 which is fitted with an upper rib 59 joined to a lifting connecting rod 60 and a backward movement connecting rod 61 via which the support 58 is suspended from the circular plate 51 and by which also its position is controlled. In fact, each lifting connecting rod 60 is joined via its opposing and upper extremity to a crown 92 engaged in a tilting nut 93 screwed, like the lowering nut 55, to the threaded spindle 52. The crown 92 is housed in the tilting nut 93 by means of blocks and needle rollers 94 enabling it to be independent on rotation of the latter: when the tilting nut 93 is rotated, it lifts up or lowers and activates the crown 923 without it rotating; the lifting connecting rods 60 are activated, thus provoking the tilting of the supports 58.

The backward connecting rod 61 is directly joined to the circular plate 51 via its upper extremity and is moreover connected to it by a rotation inhibition mechanism 62 (visible on FIG. 4) which mainly includes a rod 63 which traverses the backward movement rod 61 and an elongated aperture 64 established through an ear 65 forming a protuberance under the circular plate 51. A spring 66 is compressed between a shoulder 67 of the rod 63 and the ear 65 and tends to drive the rod 63 radially inwards. However, this movement is halted by a stop 68 of the rod 63 which bears an elongated knife 69. In the original position, the stop 68 has fully come out of the aperture 64, the knife 69 is perpendicular to it and intersects it with its edge resting on the outer face of the ear 59. The spring 66 is highly stretched and prevents the backward movement connecting rod 93 from rotating. Finally, the tilting nut 93 is sufficiently lifted up so that the support 58 in the mounting unit 53 is horizontal.

Figure 2:
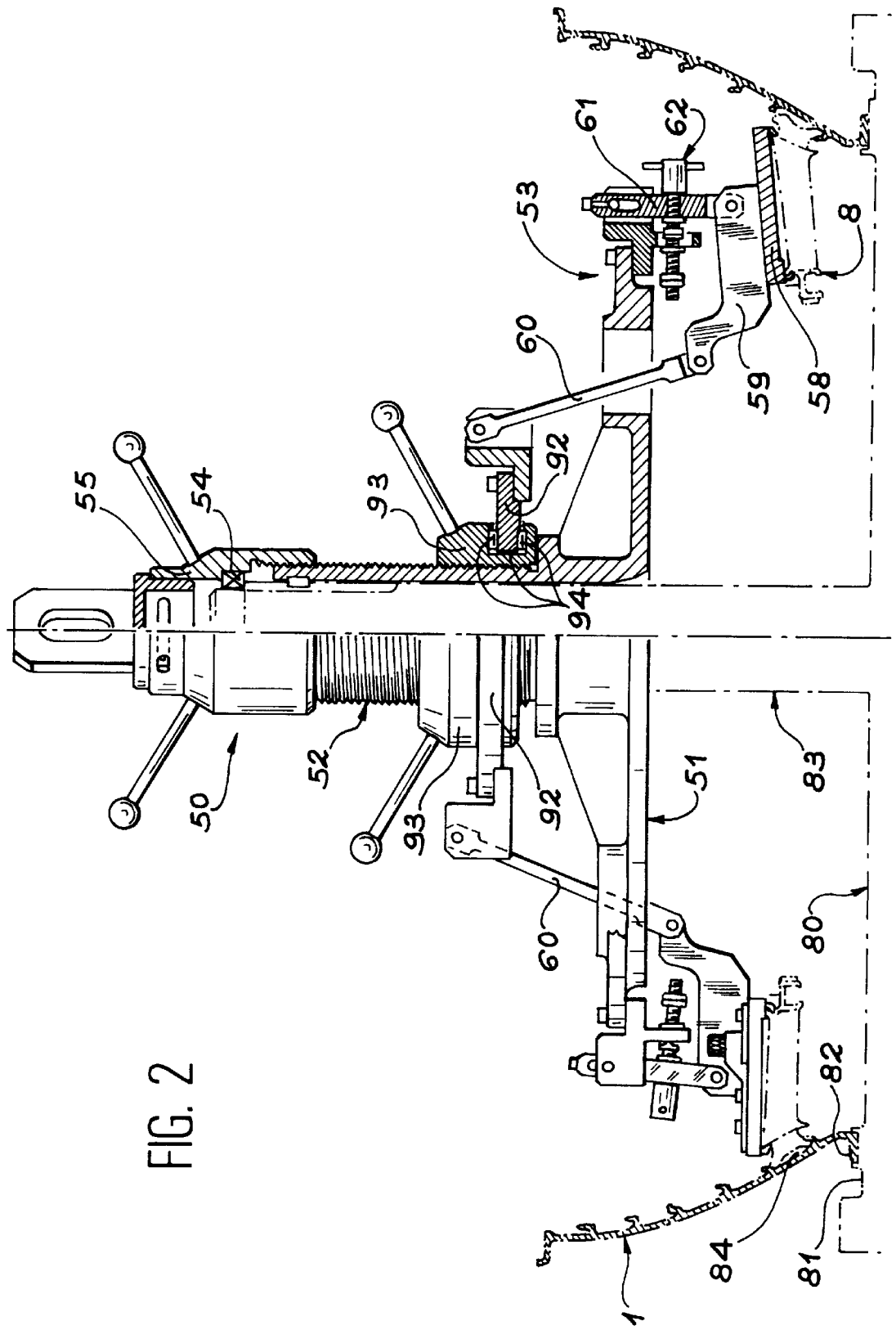
FIG. 2 represents more particularly the tool via which the sectors are picked up and carried to the turbo aero engine casing until they arrive at their final mounting position.
Figure 3:
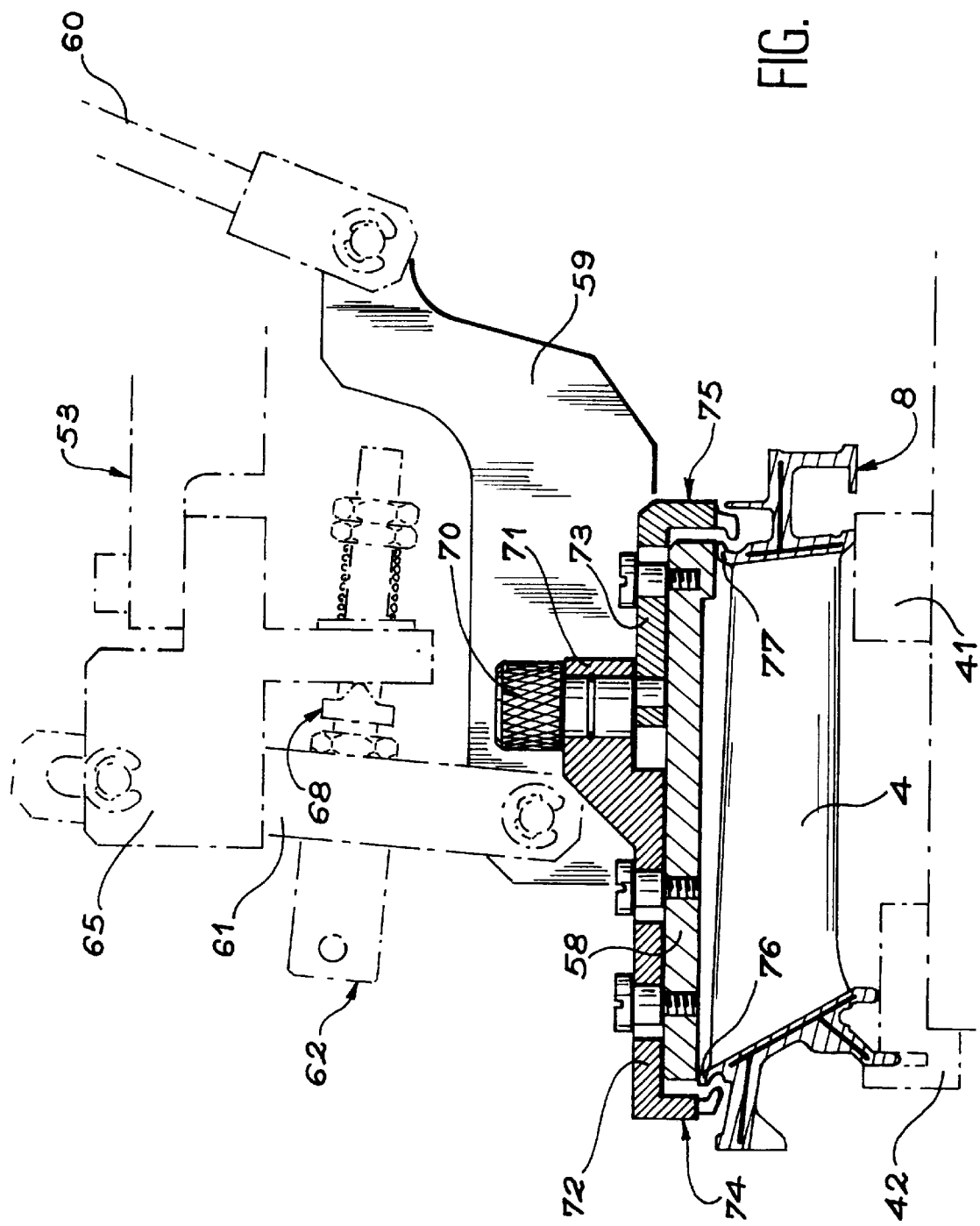
FIG. 3 shows details of the mounting units of the tool.
Figure 5:
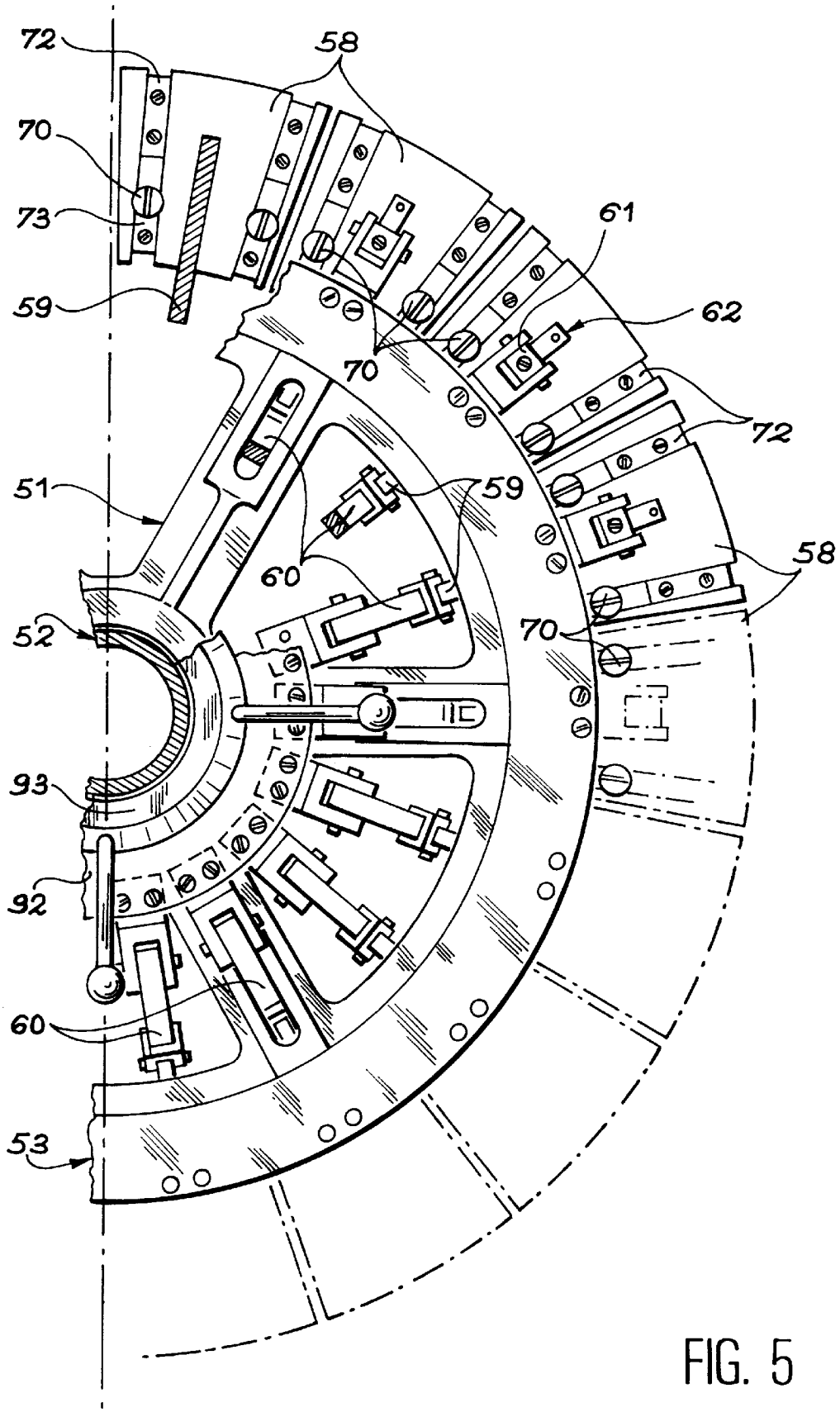
FIG. 5 is a top view of the tool of FIG. 2.

The central plate 51 and the mounting units 53 are then lowered until the supports 58, which respectively hang over the sectors 8, touch them, this being illustrated on FIG. 3. Then the control buttons 70 of a pair of cams 71 situated on the sides of each of the supports 58 (shown on FIG. 5) are rotated, the effect of each of them being to bring together a pair of jaws 72 and 73 each ended by a hook 74 or 75 which extends in front of the radial edge of the support 58 as far as the height of the upper edges 76 and 77 of the sectors 8. The drawing closer movement of the jaws 72 and 73 ends in the engagement of the extremities of the hooks 74 and 75 under these edges 76 and 77 and thus on the picking up of the sectors 8 by the mounting units 53 (shown on FIG. 1). The shims disposed between the sectors 8 can then be removed and, after the circular plate 51 and the mounting units 53 have been lifted up again via an inverse rotation of the lowering screw 55 for lifting up the sectors 8 of the crowns 41 and 42, the main tool 50 is lifted up from the mandrel 44 of the mounting plane 40 and borne towards another portion of the tool, namely a base 80 (shown on FIG. 2) composed of a second disk 81 on which the casing 1 is laid and a second mandrel 83 adjusted at the center of the disk 81 and on which the threaded spindle 52 of the main tool 50 is threaded until the top of the second mandrel 83 stops against the internal ring of the ball bearing 54 as previously. The casing 1 is laid via its front tapered extremity on support and centering surfaces 82 of the second disk 81 so that its axis is vertical and the mounting throat 84 of the distributor 4, mainly delimited by the lips 13 and 16, opens upwards. As the circular plate 51 is then lifted up, the distributor overhangs the mounting throat 84.

The mounting of the sectors 8 then requires that the circular plate 51 and the mounting units 53 descend via a rotation exerted on the lowering nut 55 but not before having previously lowered the tilting nut 93 so as to give the sectors 8 of the distributor 4 a slight inclination (the radially internal edge of the sectors 8 being lowered) by, say, 6°. Moreover, the rods 63 are rotated by a quarter of a turn so as to release the articulation inhibition mechanisms 62: the knives 69 are aligned with the apertures 64 and penetrate into them under the action of the springs 66 which become slack; the backward movement connecting rods 61 tilt inwards (radially) which makes the supports 58 move backward and accentuates their inclination. The joint effect of these two tiltings of the supports 58 is to bring closer the sectors 8, at least at the location of the second projections 14 which then draw a narrow circle smaller than the opening of the second lips 16, as can be seen on the right-hand half of FIG. 2. It is then possible to make the mounting units 53 descend into the casing 1 by means of a new rotation of the lowering nut 55 until the sectors 8 move into the opening of the second lips 16 and until the first projections 10, which have remained approximately with the mounting diameter despite the tiltings of the supports 58, touch the first axial lips 13.

Figure 4:
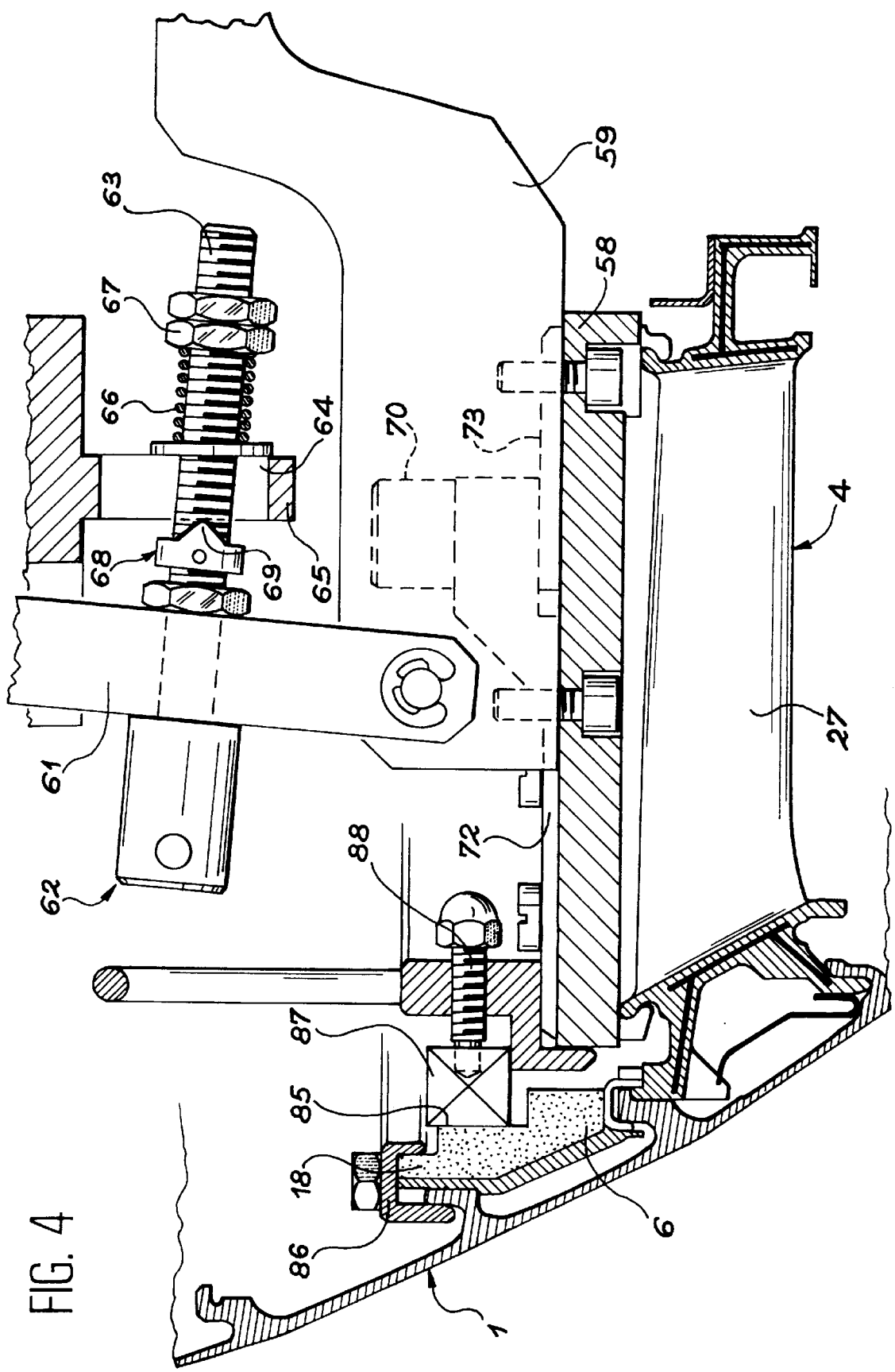
FIG. 4 shows other details of these mounting units.

The tilting nut 63 is then lifted up along the threaded spindle 51 which provokes the pivoting of the sectors 8 around the first projection 10 and brings closer the second projections 14 of the second lips 16 until the adjustment of the radially external surfaces 19 on the circular bearing 20 has been carried out, as shown on the left-hand portion of FIG. 2. It is then possible to install the abradable coating 6 situated immediately at the rear and block the distributor 4 by the hook 22 (FIG. 4). In addition, a retaining ring 86 can be installed temporarily around the rear extremity 18 of this abradable coating 6 so as to keep it temporarily in place until the rotor wheel 3 situated in front of said coating 5 is mounted. After this, the tool for placing the next distributor 4 is introduced.

So as to facilitate the placing of the retaining ring 86, it is advisable to place blocks 87 on the mounting units 53. These blocks 87 are deployed radially and outwardly by pressure screws 88 until they stop against the internal face 85 of the abradable coating 6 which is then firmly kept in place and does not move when the retaining ring 86 is placed. The blocks 87 are then moved backwards, the jaws 74 and 75 are loosened from the sectors 8 and the main tool 50 can be removed from the casing 1.

The tools described also lend themselves to dismantling of the same distributor 8 via a series of operations effected opposite to the preceding operations.

What is claimed is:

1. A tool for mounting the distributor of a turbo engine, comprising:
   a circular plate;
   a plurality of mounting units arranged around said plate so as to correspond to a plurality of distributor sector mounting positions formed on a casing of a turbo engine each of said plurality of mounting units including:
      a support configured for supporting a distributor sector of a turbo engine;
      suspension mechanism configured to suspend said support from said circular plate, said suspension mechanism including first and second connecting links with first ends pivotally connected to said support, said first connecting link having a second end pivotally connected to said circular plate; and
      a tilt mechanism configured to control a tilting of said support, said tilt mechanism being disposed between said support and said circular plate, such that a distributor sector supported by said support can be tilted, said tilt mechanism also including a member to which said second links are commonly connected.

2. A tool according to claim 1, wherein the said mechanism further comprises a nut screwed onto a threaded spindle of said circular plate, and said member comprises a crown rotating in said nut about said threaded spindle.

3. A tool according to claim 2, further comprising a base on which a turbo engine casing is laid, and a lowering mechanism from which said circular plate is suspended.

4. A tool according to claim 3, wherein said lowering mechanism includes a second nut screwed into said threaded spindle and supported by a mandrel of said base, said threaded spindle configured to slide relative to said mandrel.

5. A tool according to claim 1, wherein said second ends of said first links are connected to said plate by a rotation inhibition mechanism for inhibiting rotation of said links with respect to said plate, said mechanism for inhibiting rotation being releasable.

6. A tool according to claim 5, wherein said rotation inhibiting mechanism comprises spring means which bias said first links radially inward when said mechanism is released.

7. A tool according to claim 1, including a ring for retaining sealing segments placed in the casing close to the distributor and around rotor sectors of a turbo engine wheel.

8. A tool according to claim 7, including blocks movable in a radial direction so as to press sealing segments onto the casing.

9. A tool according to claim 1, further comprising a base for supporting a plurality of turbo engine distributor sectors in a radial arrangement which corresponds to an arrangement of the sectors when the secotrs are installed in a casing of a turbo engine.

* * * * *

UNITED STATES PATENT AND TRADEMARK OFFICE
CERTIFICATE OF CORRECTION

PATENT NO. : 5,918,356

DATED : July 6, 1999

INVENTOR(S): Jacques G. P. GUERIN, et al.

It is certified that an error appears in the above-identified patent and that said Letters Patent is hereby corrected as shown below:

On the Title page, item [30] has been omitted. It should be:

--[30]     Foreign Application Priority Data
    May 2, 1996 [FR] France ................. 96 05486--

Signed and Sealed this

Thirteenth Day of June, 2000

Attest:

Q. TODD DICKINSON

*Attesting Officer*                *Director of Patents and Trademarks*